April 9, 1963 H. L. GIWOSKY 3,085,149
MINIATURE LIGHT SOURCE
Filed Oct. 19, 1961 4 Sheets-Sheet 1
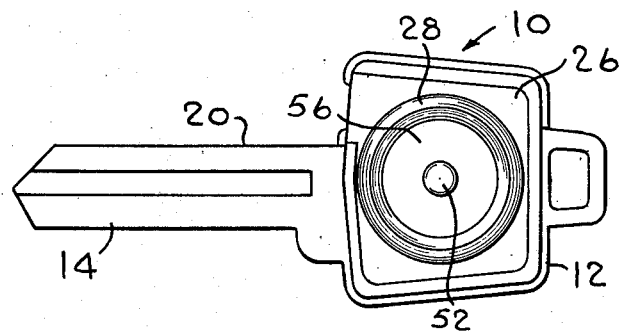
FIG. 1
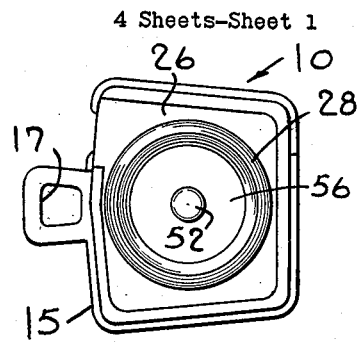
FIG. 1-A
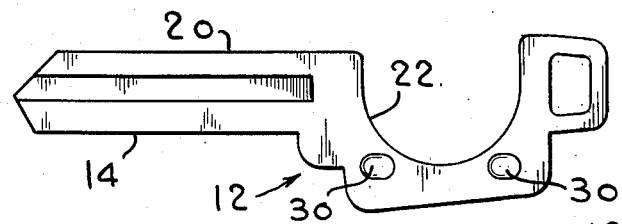
FIG. 2
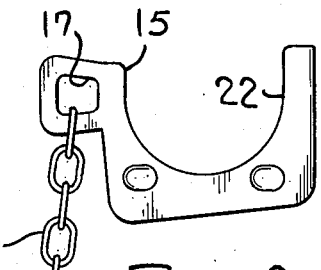
FIG. 2-A
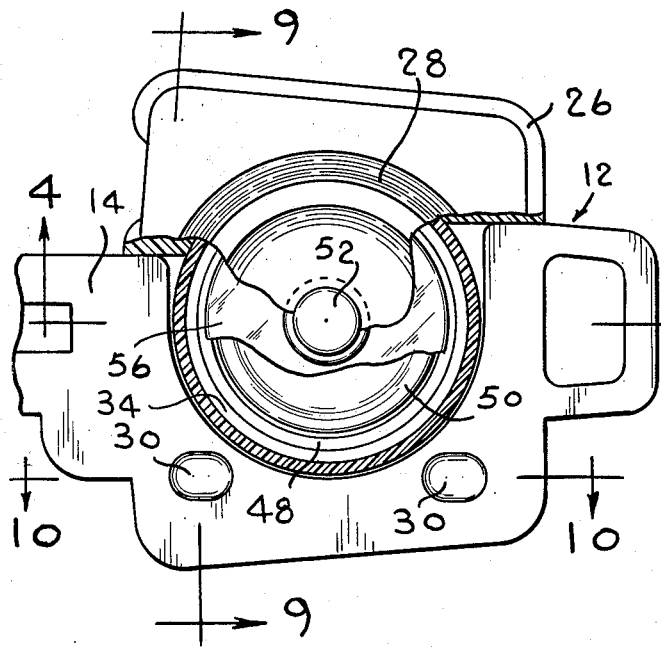
FIG. 3 FIG. 11
INVENTOR.
HARRY L. GIWOSKY
BY
ATTORNEY April 9, 1963     H. L. GIWOSKY     3,085,149
MINIATURE LIGHT SOURCE Filed Oct. 19, 1961     4 Sheets-Sheet 2

*INVENTOR.*
HARRY L. GIWOSKY
BY
ATTORNEY

April 9, 1963 H. L. GIWOSKY 3,085,149
MINIATURE LIGHT SOURCE
Filed Oct. 19, 1961 4 Sheets-Sheet 3

INVENTOR.
HARRY L. GIWOSKY
BY *Bayard H. Michael*
ATTORNEY

April 9, 1963    H. L. GIWOSKY    3,085,149
MINIATURE LIGHT SOURCE
Filed Oct. 19, 1961    4 Sheets-Sheet 4
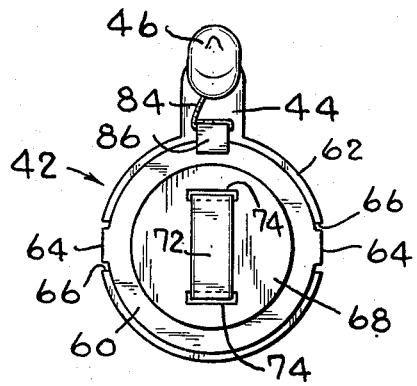
FIG. 12
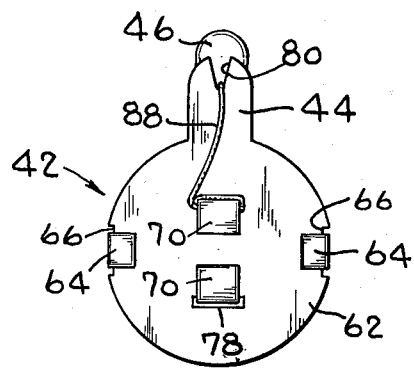
FIG. 13
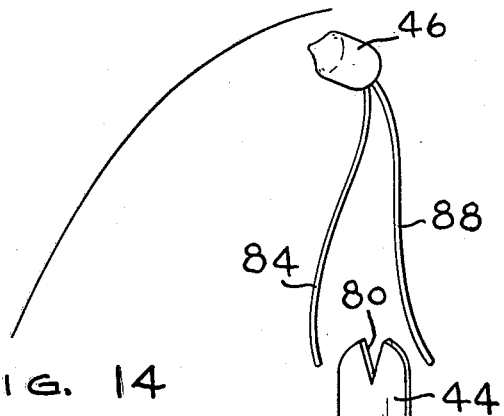
FIG. 14
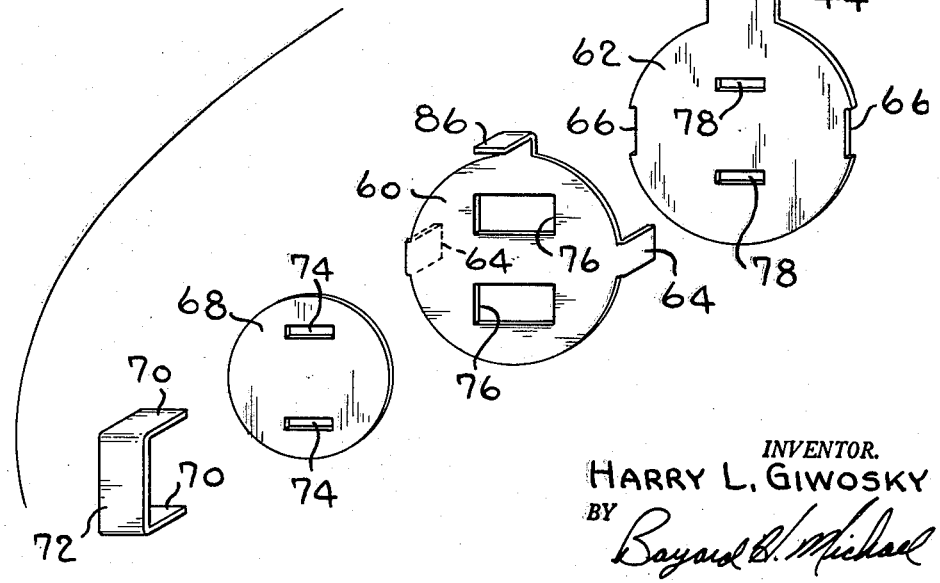
INVENTOR.
HARRY L. GIWOSKY
BY Bayard B. Michael
ATTORNEY United States Patent Office 3,085,149
Patented Apr. 9, 1963

3,085,149
MINIATURE LIGHT SOURCE
Harry L. Giwosky, Milwaukee, Wis., assignor to Realist, Inc., Menomonee Falls, Wis., a corporation of Delaware
Filed Oct. 19, 1961, Ser. No. 146,196
7 Claims. (Cl. 240—6.4)

This invention relates to miniaturized light sources.

Flashlights have been combined with many devices over the years in order to provide a handy light source for the device. During the past few years, batteries and bulbs have been made smaller permitting of smaller light sources which permit incorporating the light source within correspondingly smaller devices. The recent developments in extremely small batteries, as in hearing aids, and extremely small bulbs has made it possible to incorporate the light source within many devices without materially changing the dimensions of the device. With the present components being so small, it is possible to incorporate the light source within the handle of a key or the fob portion of a key chain. While recognizing that the naked idea of incorporating the light source within the handle of a device does not constitute invention, I have provided a novel construction permitting of low cost manufacture and increased versatility and the principal object of this invention is the attainment of these objectives, low cost manufacture leading to a versatile end product.

These objects are accomplished by mounting an integral contact and lamp holder assembly within a cavity provided in a housing that can be mounted on a number of different devices. A window is provided on one side of the housing through which a beam of light will be produced by the light source. A battery is positioned in the cavity on a spring washer for movement into engagement with the contact assembly against the bias of the spring washer. A movable panel or button is provided on the external surface of the housing for moving the battery to illuminate the lamp. The housing is designed for simple and easy disassembly for servicing and can be clamped on adaptors for a number of devices such as key blanks, key chains and the like. An inter-locking arrangement is provided between the housing and the adaptor so that the beam of light will be directed along a predetermined path.

Other objects and advantages will be pointed out in, or be apparent from, the specification and claims, as will obvious modifications of the embodiments shown in the drawings, in which:

FIG. 1 is a side view of the miniaturized light mounted on an adaptor for a key blank;

FIG. 1–A is a side view of the miniaturized light mounted on an adaptor for a key ring;

FIG. 2 is a side view of the key blank adaptor;

FIG. 2–A is a side view of the key ring adaptor;

FIG. 3 is a view partly in section showing the light assembly;

FIG. 11 is an end view of the battery;

FIG. 12 is a front elevation view of the light holder and contact switch assembly;

FIG. 13 is a rear elevation view of the light holder and contact switch assembly; and FIG. 14 is an exploded view of the light holder and contact switch assembly.

Figure 4:
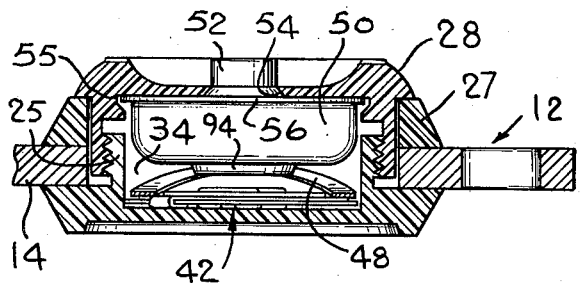
FIG. 4 is a view taken on line 4—4 of FIG. 3 showing the battery switch arrangement.
Figure 5:
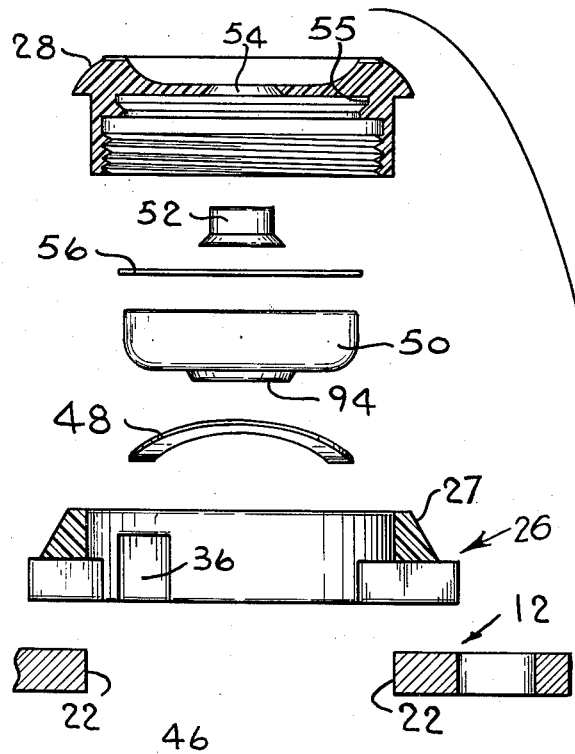
FIG. 5 is an exploded view of the battery switch arrangement.
Figure 6:
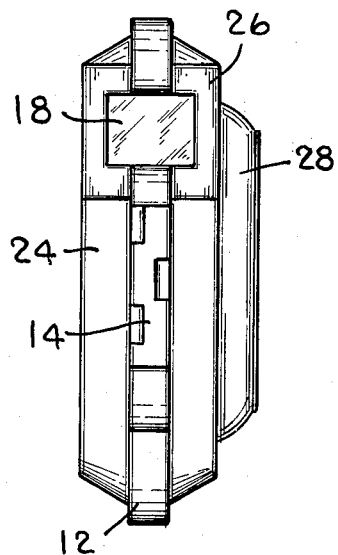
FIG. 6 is an end view of the light mounted on the key blank adaptor.
Figure 7:
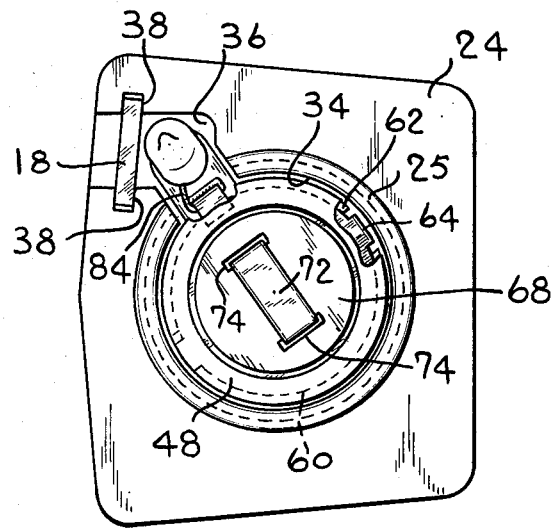
FIG. 7 is a view of the interior of the contact socket with the lamp holder and contact assembly in position.

In the drawings, housing 10 for the miniaturized light is shown attached to an adapter 12 having a key blank section 14. This showing is by way of example only since the housing can be clamped on a number of different adaptors which are designed for different purposes. A window 18 is provided in the side of the housing for directing a beam of light from the housing along the back 20 of the key blank section so that the opening in the lock to be opened is illuminated as the key blank is inserted therein.

Figure 9:
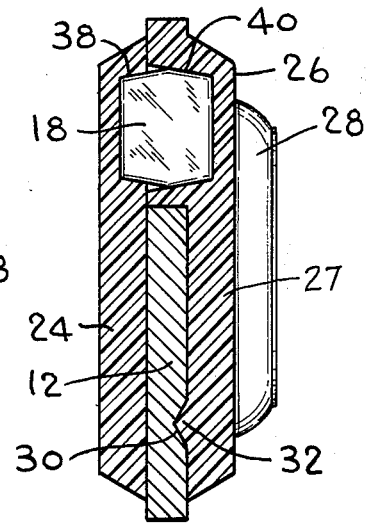
FIG. 9 is a view of the window taken on line 9—9 of FIG. 3.
Figure 8:
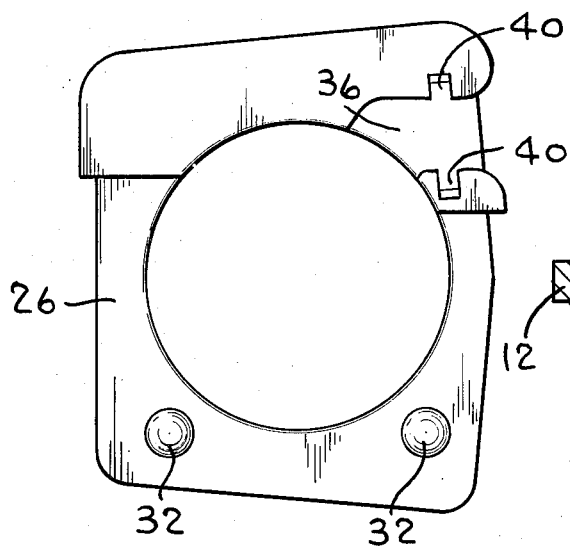
FIG. 8 is a view of the interior of the collar.
Figure 10:
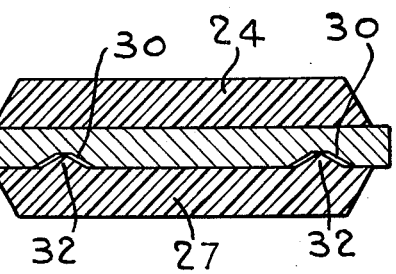
FIG. 10 is a view taken on line 10—10 of FIG. 3 showing the holding means.

The housing is mounted on the adaptor by positioning threaded flange 25 of contact socket 24 in notch 22 in the adaptor. Collar 26 is positioned on the contact socket with the adaptor located between the contact socket 24 and section 27 of the collar which section is sufficiently removed from the contact socket for this purpose (FIG. 9). Retaining ring 28 is screwed onto the threaded flange of the contact socket squeezing the adaptor between the collar and contact socket. Indentations 30 are provided on one side of the adaptor to engage dimples 32 (FIG. 10) on section 27 of the collar to align and lock the adaptor in the housing. With this arrangement it is possible to loosen the retaining ring and remove the adaptor without completely disassembling the housing. Different adaptors can then be easily interchanged in the housing thereby providing a miniaturized light that can be readily adapted for different purposes.

The housing includes a central cavity 34 formed between the retaining ring and the contact socket and a side channel 36 formed between the collar and contact socket. The side channel is separated from the central cavity by the retaining ring and is closed at its outer end by window 18 positioned in slots 38 and 40 in the contact socket and collar respectively. A lamp holder and contact assembly 42 is positioned in the cavity in the contact socket with lamp holder 44 extending under the retaining ring into the side channel to support lamp 46 therein. Spring washer 48 is positioned on the contact assembly and biases a silver oxide type battery 50 against the inside surface of the retaining ring. The battery is moved into engagement with the contact assembly by a button 52 which projects through opening 54 in the retaining ring and is held therein by flexible disc 56 which is snapped into groove 55 on the inside of the retaining ring. When the housing is held between the forefinger and thumb the light will be illuminated by merely squeezing the thumb and forefinger to depress the button and move the battery into engagement with the contact assembly. The electrical circuit between the battery and the lamp is completed through the lamp holder and contact assembly as described below.

Referring to FIGS. 12 through 14, the lamp holder and contact assembly includes an electrically conductive contact disc 60 mounted on an insulator disc 62 by bending tabs 64 around notches 66. A second insulator disc 68 is mounted on the face of the contact disc by inserting the legs 70 of contact staple 72 through holes 74 in disc 68, holes 76 in contact disc 60 and holes 78 in disc 62. The legs of the contact staple are bent back flat against the outer surface of disc 62. Holes 76 are larger than holes 74 and 78 so that the contact staple is insulated from the contact disc. The lamp is positioned in V-slot 80 in lamp holder 44 of the insulator disc with terminal 84 wrapped around tab 86 on contact disc 60 and terminal 88 wrapped around one of the legs of the contact staple. This arrangement can be quickly and easily assembled into a very compact unit that is simply positioned in the contact socket when the housing is assembled.

In assembling the housing and adaptor, the lamp holder and contact assembly is placed in the contact socket with the lamp holder aligned in the side channel. The spring washer is positioned on top of the assembly in electrical engagement with contact disc 60. The battery is placed on top of the spring washer with center projection 94 of the battery spaced from the contact staple by the spring washer. The contact socket is then positioned in the adaptor and the collar placed on the opposite side of the adaptor. The retaining ring is screwed tightly onto the contact socket clamping the adaptor in position.

When the button is pressed, the battery will be moved into engagement with the contact assembly with projection 94 engaging the contact staple. An electric circuit will be established from the projection on the battery through the contact staple and terminal 88 to the lamp and back through terminal 84, contact disc 60, and spring washer 48, to the outer surface of the battery.

A practical embodiment of the miniaturized light is shown in FIGS. 1–A and 2–A where the housing is shown mounted on a key ring adaptor 15. The adaptor is clamped in the housing in the same manner as the adaptor for the key blank. An aperture 17 is provided in the side of the key ring adaptor for mounting on key chain 19. This arrangement for the miniaturized light has proven to be a very attractive device because of its low cost and convenient size.

Although only two embodiments of the present invention have been illustrated and described, it will be apparent to those skilled in the art that various changes and modifications may be made therein without departing from the spirit of the invention or from the scope of the appended claims.

I claim:

1. A unitary lamp holder and contact assembly comprising, an insulating disc having a lamp holder integral therewith and projecting therefrom, a pair of slots in the disc and a pair of notches on the periphery of the disc, an electrically conductive disc having a pair of slots, a pair of tabs and an electrical contact tab, said conductive disc being mounted on said insulating disc with the slots in the insulating disc aligned with the slots in the conductive disc and the pair of tabs being bent around the notches in the insulating disc; a second insulating disc having a pair of slots therein; and an electrically conductive staple having a pair of legs, said second insulating disc being mounted on the conductive disc by passing the legs of the staple through the slots in the first and second insulating disc and the conductive disc.

2. A miniaturized light source comprising, a lamp holder and contact assembly according to claim 1, a lamp mounted on the lamp holder having one lead connected to the contact tab and the other lead connected to the contact staple, an electrically conductive spring positioned to engage the conductive disc, and a miniaturized battery mounted on said spring for movement into engagement with said staple thereby completing an electrical circuit from the battery through the spring, conductive disc, lamp, staple and back to the battery.

3. A housing for a miniaturized light according to claim 2 having a socket member, a blank section, a collar member and a retaining member for clamping the blank section and collar member on the socket member, said socket member and retaining member forming a cavity for said miniaturized light and a button means projecting from said retaining member for moving said battery into engagement with said contact staple to energize said light.

4. A housing according to claim 3 wherein said socket member and collar member include a lamp cavity exterior to the retaining member and a window supported between said socket member and collar member for directing a beam of light along a predetermined path.

5. A miniaturized light source comprising, a housing having a socket member, a collar member mounted on said socket member and a retaining member for holding the collar member on the socket member, said collar member having a section spaced from the socket member for clamping an adaptor between the section and the socket member, said socket member and retaining member forming a central cavity in the housing, a lamp and contact assembly positioned in said cavity, a source of potential positioned in said cavity, and means in said retaining member for moving said source of potential into engagement with said contact assembly to energize said lamp, said lamp and contact assembly comprising a first insulating disc having a lamp holder projecting outward therefrom to support the lamp, a pair of slots in the disc and a pair of notches in the periphery of the disc, an electrically conductive disc having a pair of slots, a pair of tabs and an electrical contact tab, said conductive disc being mounted on said insulating disc with the slots in the insulating disc aligned with the slots in the conductive disc and the pair of tabs being bent around the notches in the insulating disc, a second insulating disc having a pair of slots therein, and an electrically conductive staple having a pair of legs, said second insulating disc being mounted on the conductive disc by passing the legs of the staple through the slots in the first and second insulating disc and the conductive disc, said lamp being connected to said staple and said electrically conductive disc.

6. A miniaturized light source according to claim 5 wherein said source of potential comprises, a silver oxide cell and an electrically conductive spring washer connecting the external surface of the cell to the electrically conductive disc, the lamp being energized when center of the cell is moved into engagement with the staple.

7. A key and light arrangement comprising, an adaptor having a key section integral therewith and a hollow housing mounted on said adaptor, a unitary lamp holder and contact assembly positioned within said housing, a lamp mounted on said assembly, a battery movable within said housing into and out of engagement with said contact assembly, electrically conductive spring means biasing the battery to an inoperative position, and means projecting exteriorly of said housing for moving said battery into engagement with said contact assembly to illuminate said lamp, and means for directing the light from the housing parallel to the longitudinal axis of the key section, said lamp holder and contact assembly including a first insulating disc having a lamp holder projecting therefrom, a contact disc mounted on said first insulating disc, a second insulating disc, a contact staple holding said second insulating disc on the contact disc, said contact staple and contact disc being insulated one from the other, the lamp having one terminal connected to the contact disc and the other terminal connected to the contact staple.

References Cited in the file of this patent

UNITED STATES PATENTS

| 2,987,695 | Peak et al. | June 6, 1961 |
| 2,988,632 | Curtis | June 13, 1961 |

FOREIGN PATENTS

| 1,227,982 | France | Mar. 7, 1960 |